P. KAEMMERER.
FOLDING PHOTOGRAPHIC CAMERA.
APPLICATION FILED MAY 26, 1906.

902,822.

Patented Nov. 3, 1908.

Witnesses

Paul Kaemmerer
Inventor
By Dickerson, Brown,
Raegener & Binney
Attorneys

UNITED STATES PATENT OFFICE.

PAUL KAEMMERER, OF STEGLITZ, NEAR BERLIN, GERMANY, ASSIGNOR TO THE FIRM OF OPTISCHE ANSTALT C. P. GOERZ AKTIENGESELLSCHAFT, OF FRIEDENAU, NEAR BERLIN, GERMANY.

FOLDING PHOTOGRAPHIC CAMERA.

No. 902,822.　　　Specification of Letters Patent.　　　Patented Nov. 3, 1908.

Application filed May 26, 1906. Serial No. 318,834.

*To all whom it may concern:*

Be it known that I, PAUL KAEMMERER, a citizen of the German Empire, and resident of Steglitz, near Berlin, Germany, engineer, have invented certain new and useful Improvements in Folding Photographic Cameras, of which the following is a specification.

My invention relates to folding photographic cameras and consists more particularly in providing special means for pulling the objective carrier out of the camera casing on opening the hinged cover of the casing.

Particulars of the invention are explained hereafter with reference to the drawings forming part of this specification.

Figure 1:
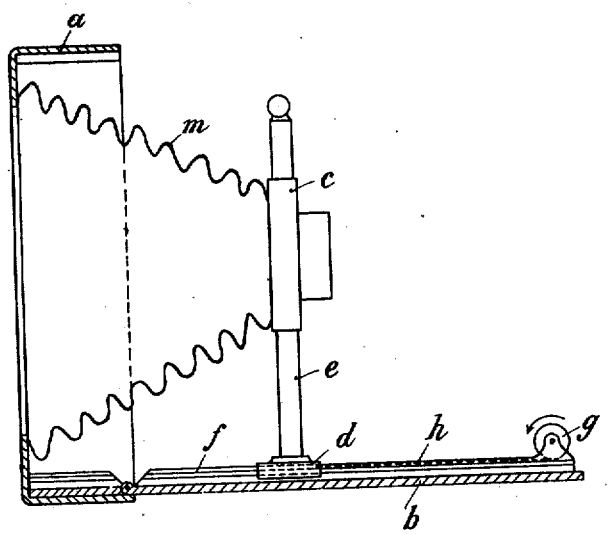
Figure 2:
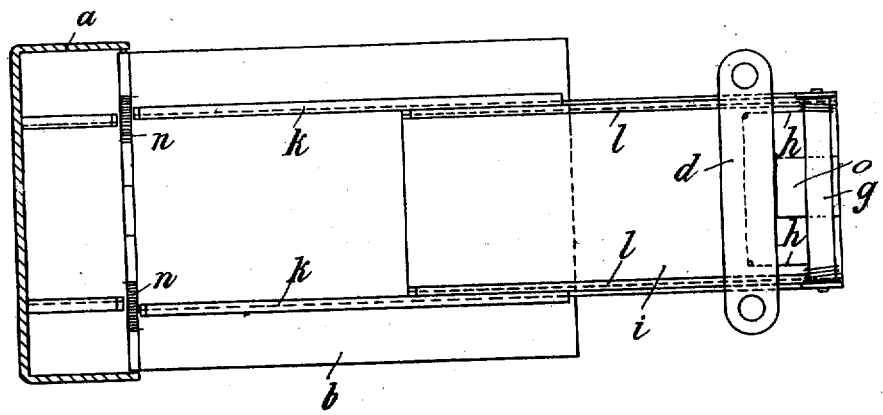

Figure 1 shows diagrammatically in vertical section an embodiment of a camera in accordance with the invention. Fig. 2 is a plan view of a modified form of a camera provided with a slide on the hinged cover, it being assumed that the camera is provided with a bellows and an objective carrier, such as represented in Fig. 1.

On the drawing corresponding parts are indicated in both figures with the same reference letters.

The camera casing is indicated by $a$; the letter $b$ indicates a hinged cover. The objective carrier is indicated by $c$. The objective carrier $c$ is shown in Fig. 1 as being connected with a slide piece $d$ by means of pillars $e$. In the construction shown in Fig. 1 the cover $b$ is provided with rails $f$ for guiding the objective-slide $d$. The spring traction roller, by which the drawing out of the objective is effected, is in both cases indicated by $g$. The connection of this spring traction roller with the objective-slide $d$ is effected by means of wires or cords $h$.

In Fig. 1 the spring traction roller $g$ is directly mounted on the hinged cover $b$ whereas in the form of construction shown in Fig. 2 the spring traction roller $g$ is mounted on a pull-out slide $i$ guided by the rails $k$ of the cover $b$ and carrying rails $l$ for guiding the objective-slide $d$. The displacement of the draw-out slide $i$ on the cover $b$ can be effected in any desired manner not shown on the drawing, for instance by means of rack and pinion. The camera bellows which is represented in Fig. 1 only is indicated by $m$.

In Fig. 2 two springs $n$ are indicated, adapted to actuate the cover $b$. In the same figure a stop member for the objective slide $d$ has been represented and designated $o$.

The operation of the camera takes place in the following manner:—On the opening of the hinged cover $b$ which may be subject to the action of spring $n$ in the known manner, the spring roller $g$ pulls the objective-slide $d$ out of the camera case $a$ by means of the traction devices $h$, as soon as the cover is completely opened, so that the objective-slide can pass over to the rails $f$ of the cover $b$ or the rails $l$ of the drawing-out slide $i$. Suitable means such as stop $o$ can be provided to stop the automatic forward movement of the objective, due to the spring roller $g$, when the objective has reached the position required for "infinity".

In the form of construction illustrated in Fig. 2 the objective can be moved beyond the "infinity" position by pulling out the slide $i$ beyond the outer edge of the plate $e$ as shown on the drawing. If it is intended to close the camera the operator pushes member $c$ back into the box and by so doing unwinds traction members $h$ and places the roller spring under tension as in the operation of the ordinary winding curtain, so that the spring roller is capable of automatically drawing out the objective slide on reopening the hinged cover as above described.

I do not limit myself to the special details of construction because these may be modified within the scope of the appended claims. For instance instead of the spring roller other equivalent actuating means may be used and instead of one drawing-out slide a plurality of slides may be employed.

Having now particularly described and ascertained the nature of my said invention and in what manner the same is to be performed, I declare that what I claim and desire to secure by Letters Patent is:

1. In a folding camera, the combination with a casing, a hinge cover for the same provided with slide ways, and a movable objective carrier adapted to slide on said slide ways, of actuating means for said movable objective carrier, said actuating means being supported on the hinge cover and comprising a rotatable roller coupled with the objective carrier by traction devices, and adapted to take up said traction devices when the camera is opened.

2. In a folding camera, the combination with a casing, a hinge cover for the same provided with slide ways, and a movable objective carrier adapted to slide on said slide ways, of a spring actuated roller supported on the hinge cover, and traction devices connecting said objective carrier with said spring actuated roller, said traction devices being adapted to be taken up by said spring actuated roller, when the camera is opened.

In testimony whereof I have signed this specification in the presence of two subscribing witnesses.

PAUL KAEMMERER.

Witnesses:
WOLDEMAR HAUPT,
HENRY HASPER.